United States Patent
Anderson et al.

(10) Patent No.: US 10,282,104 B2
(45) Date of Patent: May 7, 2019

(54) DYNAMIC OPTIMIZATION OF RAID READ OPERATIONS

(71) Applicant: International Business Machines Corporation, Armonk, NY (US)

(72) Inventors: Clark A. Anderson, Rochester, MN (US); Adrian C. Gerhard, Rochester, MN (US); Daniel F. Moertl, Rochester, MN (US); Rick A. Weckwerth, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 125 days.

(21) Appl. No.: 15/170,124

(22) Filed: Jun. 1, 2016

(65) Prior Publication Data

US 2017/0351426 A1    Dec. 7, 2017

(51) Int. Cl.
*G06F 3/06*    (2006.01)

(52) U.S. Cl.
CPC .............. *G06F 3/061* (2013.01); *G06F 3/065* (2013.01); *G06F 3/0635* (2013.01); *G06F 3/0659* (2013.01); *G06F 3/0665* (2013.01); *G06F 3/0689* (2013.01)

(58) Field of Classification Search
CPC ........ G06F 3/061; G06F 3/0619; G06F 3/065; G06F 3/0665; G06F 3/0689
See application file for complete search history.

(56) References Cited

U.S. PATENT DOCUMENTS

| | | | | |
|---|---|---|---|---|
| 6,397,292 | B1* | 5/2002 | Venkatesh | G06F 11/2069 711/113 |
| 6,704,812 | B2 | 3/2004 | Bakke et al. | |
| 6,721,845 | B1* | 4/2004 | Clegg | G06F 3/0613 709/201 |
| 6,988,166 | B1 | 1/2006 | Young | |
| 7,330,930 | B1* | 2/2008 | Nagshain | G06F 3/0611 711/112 |
| 7,426,655 | B2 | 9/2008 | Shaik et al. | |
| 7,979,632 | B2 | 7/2011 | Alvarez et al. | |
| 9,459,811 | B2* | 10/2016 | Chiu | G06F 3/0659 |
| 2006/0218360 | A1 | 9/2006 | Burkey | |
| 2009/0216946 | A1* | 8/2009 | Sun | G06F 3/0613 711/114 |
| 2012/0017042 | A1* | 1/2012 | Matsui | G06F 3/0608 711/114 |
| 2015/0026514 | A1 | 1/2015 | Benhase et al. | |

* cited by examiner

*Primary Examiner* — Rocio Del Mar Perez-Velez
*Assistant Examiner* — William E. Baughman
(74) *Attorney, Agent, or Firm* — Robert J. Shatto

(57) ABSTRACT

A storage subsystem records a copy of a data object on a plurality of storage devices. The storage subsystem receives a read request to read a data object. Under certain utilization conditions of the storage subsystem, a resource utilization condition satisfies a split-read criterion. In response to the resource utilization condition satisfying the split-read criterion, the storage subsystem reads at least a portion of the data object from each of the storage devices having a copy of the data object.

9 Claims, 6 Drawing Sheets

DYNAMIC OPTIMIZATION OF RAID READ OPERATIONS

BACKGROUND

The present disclosure relates to storage subsystems, and more specifically, to storage subsystems utilizing multiple copies of a data object (e.g., Redundant Array of Independent Disks, or "RAID", storage). The disclosure further relates to performing read operations to storage devices, within a storage subsystem, having a copy of the data object.

SUMMARY

According to embodiments of the present disclosure, a storage subsystem includes a plurality of storage devices. Embodiments of the storage subsystem can perform a method to process a read request to read all or a portion of a data object stored on one or more storage devices included in the storage subsystem. According to the method, an embodiment receives the request and determines that two or more of the storage devices included in the storage subsystem have a copy of the data object. Based on the two or more storage devices having the copy, embodiments determine a utilization condition associated with a processing resource associated with reading the data object. Based on the utilization condition satisfying a split-read criterion, embodiments can determine to read the data object using a plurality of read commands directed to different storage devices having the copy, and then read the data object using the plurality of read commands.

In some embodiments, the utilization condition comprises an available capacity of the processing resource, and the split read criterion is an available capacity being equal to or greater than a minimum available capacity. In alternative embodiments, the utilization condition comprises a utilization level of the processing resource and the split read criterion is the utilization level being below a utilization threshold. In the embodiments, the utilization threshold is a utilization level of the processing resource below which the reading at least a portion of the data object using a plurality of read operations can increase overall performance of the storage subsystem.

In other alternative embodiments, the utilization condition is a pseudo-utilization level of the processing resource, and the split-read criterion is the pseudo-utilization level being below a trigger threshold. The trigger threshold is a utilization level of the processing resource within a utilization gradient. The utilization gradient has a lower threshold corresponding to a utilization level below which reading a data object using a plurality of read operations can increase overall performance of the storage subsystem. The utilization gradient has a higher threshold corresponding to a utilization level above which reading a data object using a plurality of read operations can decrease overall performance of the storage subsystem. In some embodiments, that trigger level is periodically recalculated based on a recalculation period, a number of read requests received since a prior recalculation, or an amount of time that has elapsed since a prior recalculation.

Embodiments of the disclosure can include a system for performing read operations in a storage subsystem, in which the system includes a processor configured to perform the method. Still other embodiments include a computer program product that has instructions to cause a processor to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
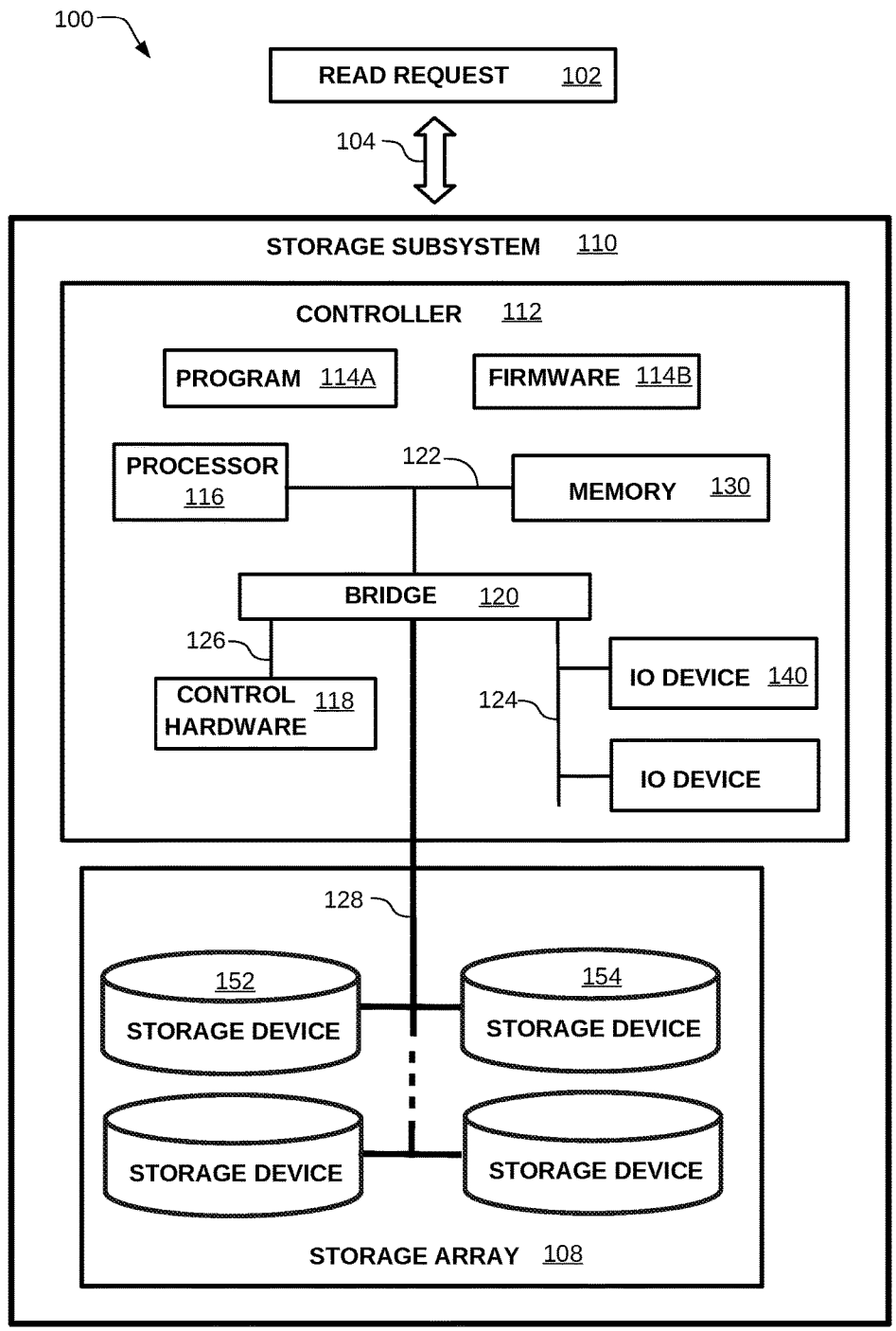
FIG. 1 is a block diagram illustrating an example storage subsystem, according to embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to reading data from a storage subsystem having multiple copies of a data object. More particularly, the present disclosure relates to reading a data object using read operations that can improve overall storage subsystem performance. While the present disclosure is not necessarily limited to such applications, various aspects of the disclosure may be appreciated through a discussion of various examples using this context.

A storage subsystem can store data within the storage subsystem and can manage access to the data. As used herein, data stored "within the storage subsystem" refers to data stored either within the storage subsystem (or, a component thereof, such as a storage device), or to data stored within another device or component communicatively coupled to the storage subsystem (e.g., a storage device external to the storage system and connected to the storage system by an electronic cable or other communications interface).

A data accessor, or simply "accessor", can communicate a request to the storage subsystem (or to components thereof, including the storage devices) to access (e.g., to read or write) particular data, such a particular file, database object, or a set of related data extents or data blocks. As used herein, "accessor" refers to any type of device or program that requests to read or write a data stored within a storage subsystem, and "data object" refers to a particular element of data stored within a storage subsystem (e.g., a file or related set of data extents or blocks). An accessor can be, for example, a computer, or a program executing on a computer or other computing device. In some embodiments, an accessor can be a component of a storage subsystem.

An accessor can be coupled to a storage system by a direct communications interface (e.g., a cable utilizing a particular communication protocol), or can be coupled to a storage subsystem by means of a network (e.g., a local or wide area network, such as an Ethernet or the Internet). An accessor can communicate the request to the storage system, or an accessor can communicate the request to an intermediary (or, a proxy) that in turn communicates the request to the storage subsystem.

A storage subsystem can store data on storage devices included in or coupled to the storage subsystem. Storage devices can be any of a variety of devices suitable for storing data records and making the records, or portions thereof, accessible for reading or writing. For example, a storage device can be a rotating magnetic disk, an optical medium such as CD or DVD ROM, a magnetic tape, a flash memory (or, "flash drive"), or a solid state disk (SSD). As used herein, data stored "on" a storage device refers to any manner in which the storage device stores the data, whether "within" the device, or in some form stored "upon" the device, according to the type of media or manner of recording data embodied in the storage device.

A storage subsystem, or storage devices within a storage subsystem, can organize data on storage devices in units of data "blocks" (e.g., 512 byte blocks) or data "extents", which can be a set of contiguous related data blocks. For purposes of illustrating the disclosure, but not limiting to embodiments, the term "data object" refers to any particular set of related data stored within a storage subsystem, such as a particular file, or a particular set of related data blocks or extents. A storage subsystem can store a data object on a single storage device, or can store individual portions of particular data on a plurality of storage devices within or coupled to the subsystem. In embodiments of the present disclosure (hereinafter, "embodiments"), the storage devices can be all of the same type and/or design; in alternative embodiments, some storage devices can be of one type and/or design and other storage devices can be of a different type and/or design.

Some embodiments of a storage subsystems can provide secure storage of a data object by storing a copy of the data object on each of a plurality of storage devices, also known as "mirroring" a data object. Mirroring can, in some embodiments, improve access performance to access the data object, such as when one storage device is heavily utilized and accessing a data object on that device would have a high access latency in comparison to another storage device having a copy and not as heavily utilized. Accordingly, embodiments can mirror a data object by storing a copy of a data object on each of a plurality of storage devices.

For example, an embodiment can store data in a Redundant Array of Independent Disks (RAID), in which the RAID array comprises a plurality of storage devices within the storage subsystem. A plurality of the RAID storage devices within the subsystem can each store a copy of a particular data object or, each device can store a copy of a portion of the data object. As used herein, "data object refers to a data object as a whole, or any particular portion of a data object that is mirrored within a storage subsystem.

An embodiment can implement a particular type of RAID scheme to store copies of a data object on the storage devices. For example, a data object can be stored according to a RAID-1 or RAID-10 scheme that includes storing identical copies of a data object on a plurality of storage devices. Hereinafter, "storage subsystem" and "subsystem" are used interchangeably to refer to an embodiment of the disclosure that stores identical copies of particular data objects on a plurality of storage devices, such as embodiments that employ RAID-1 or RAID-10 schemes.

A subsystem can receive a request to read a data object and can read the object from a particular one of the storage devices on which the identical copies of the object are stored. Under certain operating conditions of an embodiment, splitting a read request into a plurality of read operations, each directed to a different storage device having a copy of a data object, can improve overall performance of the subsystem or the performance of a particular read request. For example, reading half of a data object from each of two storage devices allows reading the data object from the storage media to be done concurrently, which can reduce the overall time to read all of the data comprising the read request.

Accordingly, a subsystem can "split" the read request into a plurality of read operations, so as to read a particular portion of the data object from each of several storage devices that store identical copies of the object. For example, a subsystem can store an identical copy of the data object on each of two storage devices. In response to a request to read the object, the subsystem can split the read request into two read operations, a first operation that reads a first portion of the object from one of the two storage device, and a second read operation that reads another portion of the data object from the other storage device. In some embodiments, read operations directed to different storage devices can each read a unique portion of a data object. In alternative embodiments, read operations directed to different storage devices can each read a portion of a data object and the portions can include common portions of the data object.

Under other operating conditions of an embodiment, splitting a read request into read operations directed at a plurality of storage devices can increase utilization of resources of the storage subsystem, or utilization of particular storage devices receiving the read operations, such that overall performance of the subsystem is either not improved, or overall reduced or degraded. For example, the storage subsystem, or storage devices, can include command queues that receive read requests, or data buffers that receive data to be read or written to a storage device. A storage subsystem, or a storage device, can include a storage controller that performs some or all of the processing of read requests. A storage subsystem, or a storage device, can have hardware components or resources utilized to process, or perform, read requests or read operations. Splitting a read request into multiple read commands can increase utilization of one or more of the resources so as to cause the resources to become "over-committed", or "backlogged", which in turn can degrade overall performance of the subsystem (e.g., increase response times to accessors, or decrease the number of read requests or read operations that can be processed within a particular period of time).

Overall performance of a subsystem can be measured in terms of, for example, total number of data read and/or write operations per unit of time (e.g., operations per second) and/or operation latency (e.g., the amount of time to complete a read or write request from the time it was received by the subsystem). As used herein, "overall performance" refers to the performance of a subsystem or, interchangeably, to performance of individual read requests, according to such measures. However, it would be apparent to one of ordinary skill in the art that a variety of other measures can be used to determine overall performance of a storage subsystem, or read requests, according to the present disclosure. It would be further apparent to one of ordinary skill in the art that processing of read requests in a particular manner (e.g., splitting a read request) can affect the utilization of resources of the storage subsystem, or processing of read or write operations (for example) by a particular storage device, in such a way as to either improve or degrade overall performance of the subsystem or a read request.

Accordingly, embodiments of the present disclosure can utilize various criteria to determine to split a read request into read operations directed to a plurality of storage devices having a copy of the requested data. These criteria can be related to operating conditions or utilization of the storage subsystem, resources of the subsystem, or storage devices so as to determine to split a read request either when doing so does not degrade overall performance, or when doing so can improve overall performance.

FIG. 1 illustrates an example system for reading a data object according to embodiments of the present disclosure. System 100 includes a storage subsystem 110 having an interface 104 to receive a read request 102 to read a data object (not shown). An accessor (not shown) can communicate the read request to the storage subsystem using interface 104, for example. An interface, such as 104, can be a communications interface (e.g., a network interface) or can be, for example, a type of input/output (I/O) interface, such as a PCI-Express bus, a SAS or SCSI bus, a Fibre Channel bus, or other I/O interfaces or data buses such as are suitable for accessing data within a storage subsystem.

Storage subsystem 110 includes storage array 108 and storage controller 112. Storage array 108 includes a plurality of storage devices, such as 152 and 154. In embodiments, two or more storage devices within a storage array can store a copy of a particular data object. For example, storage devices 152 and 154 can each store a copy of a particular data file (not shown). Storage controller 112 includes processor 116 connected by a data bus 122 to memory 130 and bridge 120. Bridge 120, which connects the processor 116 and memory 130 to control hardware 118, via interface 126, and to I/O devices, such as I/O device 140, via interface 124. Bridge 120 connects controller 112 to storage array 108 by means of interface 128. Interfaces 124, 126, and/or 128 can each be any of, for example, a communications interface (e.g., a network interface) or a type of I/O interface, such as a PCI-Express bus, a SAS bus, a SCSI bus, a Fibre Channel bus, or other I/O interfaces or data buses such as are suitable for accessing data within a storage subsystem.

In alternative embodiments, a processor, memory, and/or control hardware can be connected directly to an interface to the storage devices, and can bypass or omit a bridge, such as bridge 120. For example, in controller 112 processor 116, memory 130, and/or control hardware 118 can connect directly to interface 128, and can communicate over interface 128 to exchange (for example) read commands and read data with the storage devices in storage array 108. It would be apparent to one of ordinary skill in the art that various configurations interconnecting components of a storage controller (e.g., processors, memory, and/or control hardware) with storage devices in a storage array can enable the components and the storage devices to communicate and exchanges commands and data.

A storage controller can include one or more programs, such as program 114A. A program can be stored on a storage medium (not shown) or can be stored in a memory, such as memory 130 or a flash memory (not shown). Programs can also be embodied as firmware, such as firmware 114B, and the firmware can be stored on a storage medium (not shown) or can be stored in a memory, such as memory 130 or a flash memory (not shown). Programs can also be embodied as firmware, such as firmware 114B, Programs and/or firmware can include instructions (not shown) to perform functions for reading a data object, and a processor included in a storage controller (or, included in a storage subsystem), such as processor 116, can execute the instructions.

In embodiments, a storage controller, or a processor included in the storage subsystem, can participate in processing a read request, such as read request 102. For example, storage controller 112, or processor 116, can receive read request 102 from the interface 104. Storage controller 112, or processor 116, can determine which storage devices may contain a copy of the data object requested by read request 102, and can determine whether or not to split the read request across two or more of those storage devices having the copy. Storage controller 112, or processor 116, can embody criteria to make the determination to split read request 102. Storage controller 112, or processor 116, can utilize programs, such as 114A or firmware 114B, to process a read request.

While storage subsystem 110 and storage controller 112 are examples of embodiments within the scope of the disclosure, it would be apparent to one of ordinary skill in the art that a storage subsystem, a storage controller, and/or a storage array can be embodied in various other forms and remain within the scope of the disclosure. For example, a storage subsystem (e.g., 110) can include one or more (or, all) of the components of a storage controller (e.g., 112) as components of the storage subsystem and can, optionally, not include a storage controller.

For example, a storage subsystem can include a processor, a memory, and a program (and/or firmware) as components of the storage subsystem, and can, optionally, not include a storage controller. The processor included in the storage subsystem can participate in processing a read request, such as read request 102. For example, a processor can execute a program to receive a read request from an interface, such as interface 104. A processor included in the storage subsystem can execute a program to determine which storage devices may contain a copy of the data object requested by a read request. A processor included in the storage subsystem can execute a program, and/or firmware, to determine whether or not to split the read request across two or more of those storage devices having the copy and the program can embody criteria to make the determination to split a read request.

In some embodiments the components of a storage controller, and/or functions of a program or firmware, can be implemented as logic in an Application Specific Integrated Circuit (ASIC) or another form of electronic circuitry. The logic describing the electronic circuitry can be written in a high level design language such as VHDL or Verilog, or can be written or represented in another format suitable for generating electronic circuitry.

In another example embodiment within the scope of the disclosure, a storage subsystem, or a storage controller, can be a computer and the computer can include hypervisors and/or operating systems. A computer can include, or be coupled to, a storage array or a plurality of storage devices. One or more programs (and/or hardware elements) in the computer can perform the functions and/or operations (or, elements of these) described in the present disclosure as embodied in a storage subsystem. Programs (or, hardware) executing or included in the computer (or, in communication with the computer, such as by means of an interface like the example interface 104) can originate requests to read data from the storage devices. Programs for performing methods of the disclosure can be in the form of instructions stored in a memory (e.g., a memory like memory 130, included in the computer) and a processor (e.g., a processor like processor 116, included in the computer) can execute the instructions to embody the methods of the disclosure.

Figure 2:
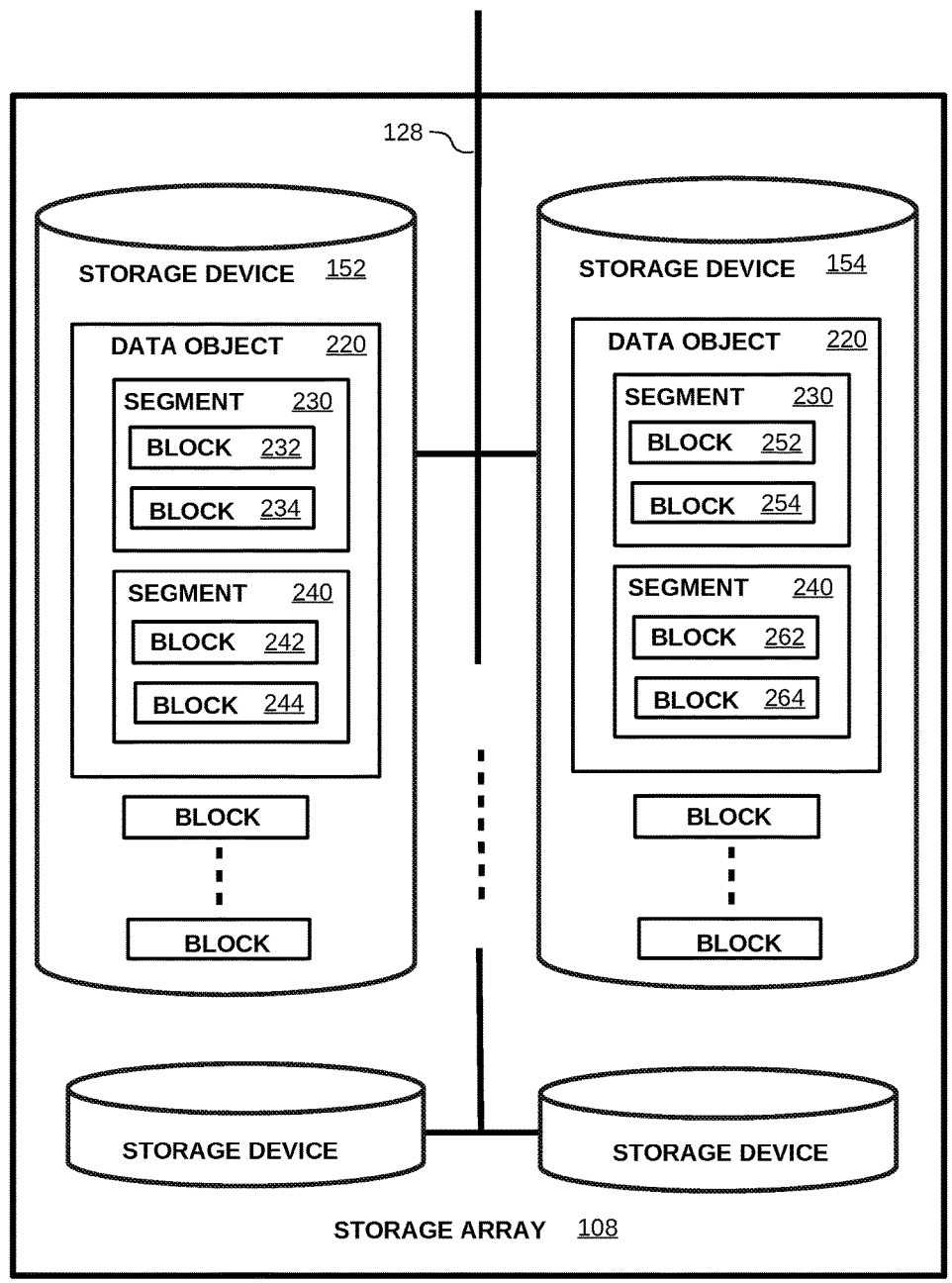
FIG. 2 is a block diagram illustrating an example of data stored on a storage device, according to embodiments of the disclosure.

FIG. 2 illustrates an example of a storage array storing a copy of a data object on each of a plurality of storage devices. For purposes of illustration only, but not intended to limit embodiments, FIG. 2 depicts storing the data object using the example storage array 108 of FIG. 1. Storage array 108 stores a copy of example data object 220 on each of storage devices 152 and 154. Data object 220 is shown including data segments 230 and 240, each of which can represent a subset of the data included in data object 220. For example, data object 220 can be a file and segments 230 and 240 can be particular data records within the file. Segments 230 and 240 in turn are illustrated as stored on the storage devices as a plurality of data blocks. A data block can be, for example, a particular physical or logical region of a storage device. A data object, or a segment thereof, can be (in some embodiments) a set of contiguous data blocks of a storage device.

By way of example, storage device 152 stores segment 230 as data block 232 and 234 and segment 240 as data blocks 242 and 244. Storage device 154 stores segment 230 as data blocks 252 and 254 and segment 240 as data blocks 262 and 264. While the example illustrates data object 220 as having two segments, each spanning two data blocks of the storage devices, in other embodiments a data object need not include segments or can encompass an arbitrary number of segments or data blocks, and a segment can span an arbitrary number of data blocks, according to the size of a particular segment, data block, or data object.

As illustrated in FIG. 1, storage array 108 includes an interface 128 that can connect it to a storage subsystem. A storage subsystem can communicate a read operation (e.g., a command to read one or more data blocks from a particular storage device) to the storage array by means of interface 128. In embodiments, a read operation can be directed to a particular storage device or, alternatively, can be directed to the storage array and the storage array can determine to which storage device to direct the read operation. A storage subsystem can receive data from storage devices 152 and/or 154 using interface 128.

Figure 3:
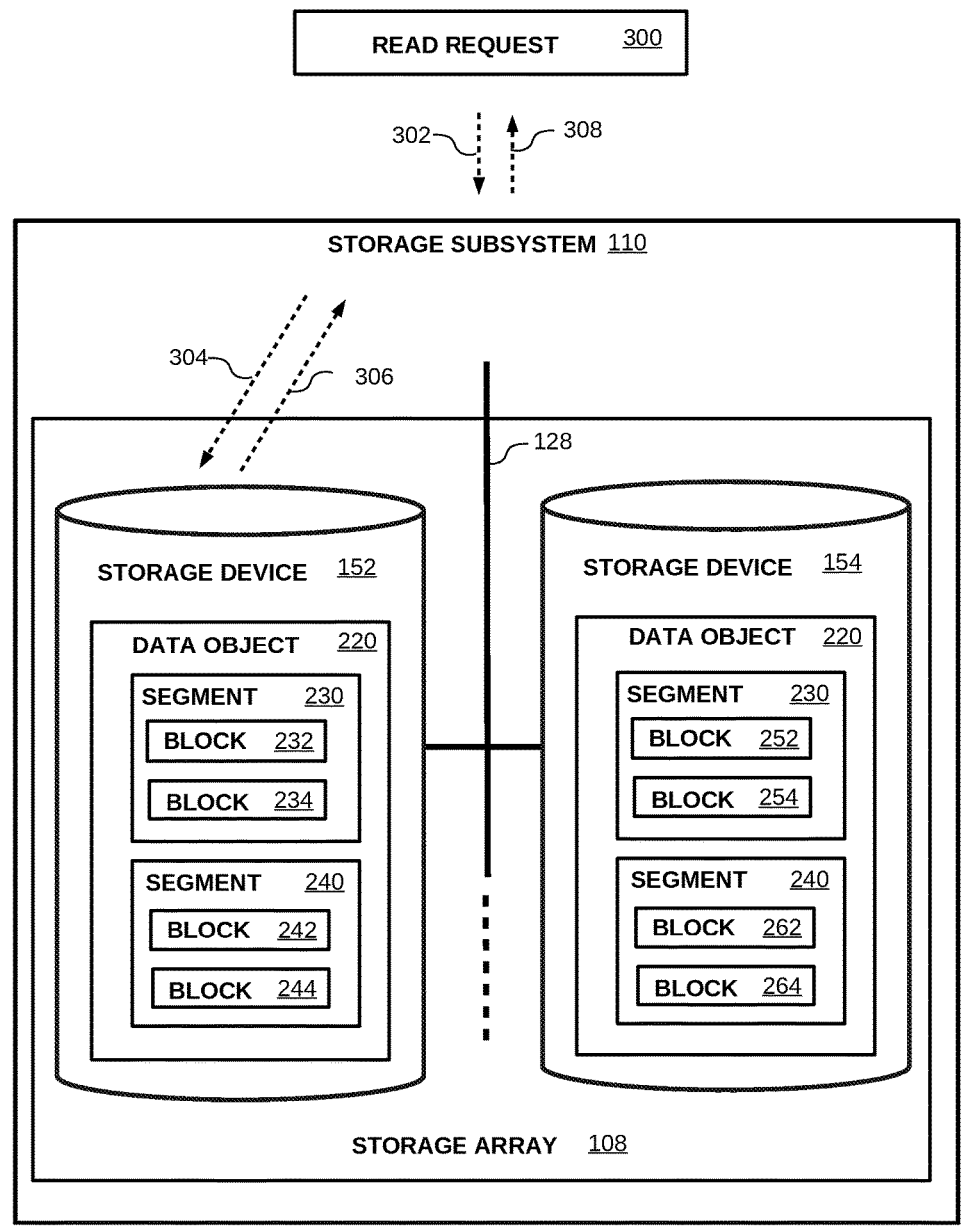
FIG. 3 is a flow diagram illustrating an example of reading data from one storage device in a storage subsystem, according to embodiments of the disclosure.

FIG. 3 illustrates an example flow to process a read request directed to a data object stored in a storage array. For purposes of illustration only, but not limiting to embodiments, FIG. 3 is described using the example storage subsystem 110 of FIG. 1 and the example data object 220 stored in storage array 108 as illustrated in FIG. 2.

At 302 storage subsystem 110 receives read request 300 to read segments 230 and 240 of data object 220. Additionally, in various embodiments, a read request can encompass any particular portion of a data object, such as just one or several particular segments of a data object, or a portion of a data object corresponding to just one or several particular data blocks storing portions of a data object.

Storage subsystem 110 can process the read request to determine which storage device, or devices, in storage array 108 contain data object 220, or portions thereof. For purposes of illustrating the example, storage subsystem 110 may determine that a copy of data object 220, or at least of the segments 230 and 240 of data object 220, is stored on both storage devices 152 and 154. According to operating conditions or utilization of the storage subsystem or one or more subsystem resources (e.g., subsystem resources to issue or monitor read operations directed to the storage devices) storage subsystem 110 can determine to read segments 230 and 240 from storage device 152. For example, storage subsystem 110 can determine that storage device 154 is highly utilized and that reading one or both of segments 230 and 240 from storage device 154 may reduce overall performance. Under such conditions storage subsystem 110 can determine that storage device 152 is a preferred device from which to read the segments.

Accordingly, at 304 storage subsystem 110 communicates (e.g., using interface 128) one or more read commands to storage device 152 to read the data blocks comprising segments 230 and 240. In an embodiment, a command to read data from a storage device can be directed to a segment, or segments, as units, or to particular data blocks comprising a segment or a data object (or, portions thereof). At 306 storage device 152 communicates (e.g., using interface 128) data blocks 232, 234, 242, and 244, comprising segments 230 and 240 on storage device 152, to the storage subsystem. At 308 the storage subsystem communicates the requested data to the accessor to complete processing read request 300.

Figure 4:
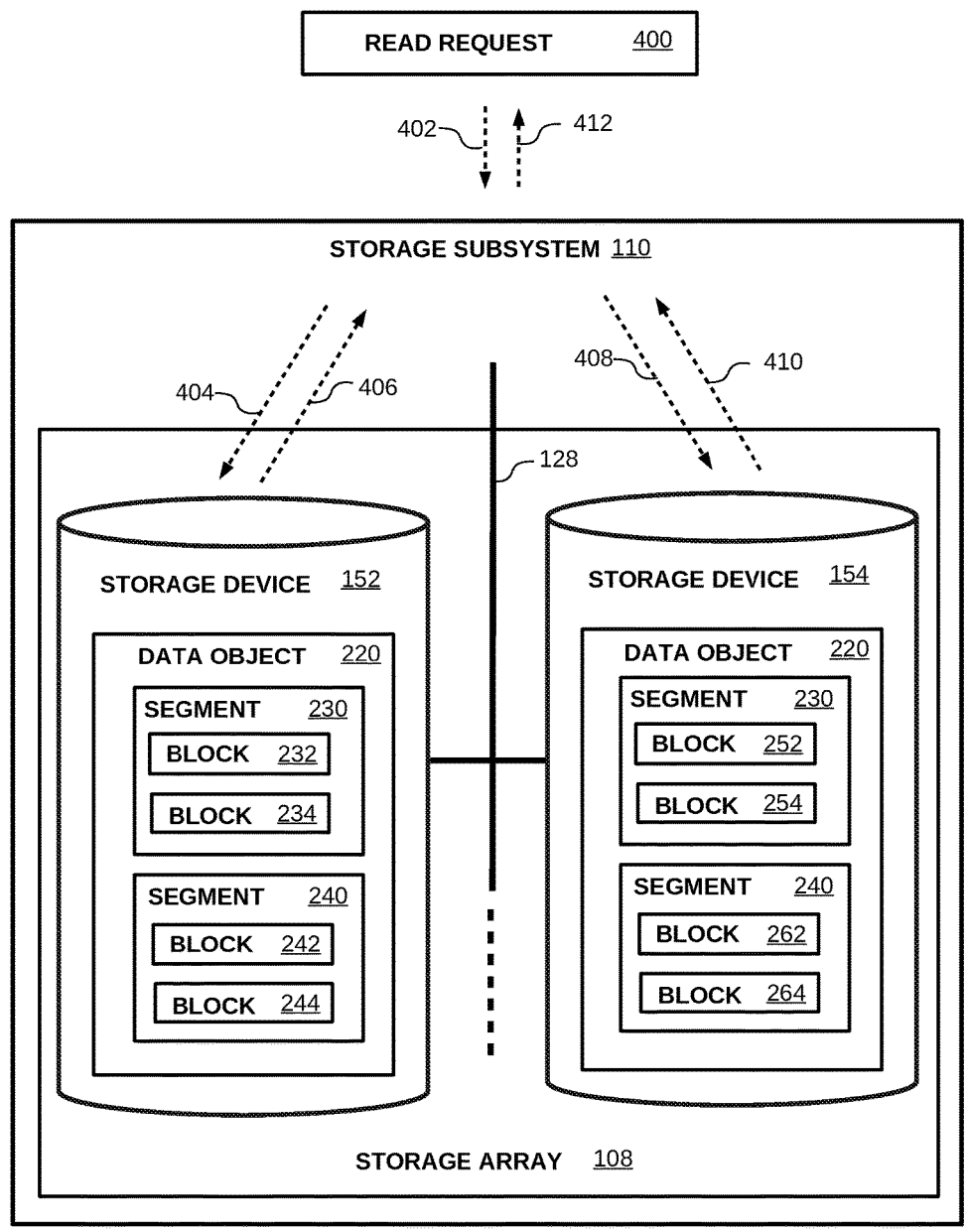
FIG. 4 is a flow diagram illustrating an example of reading data from two storage devices in a storage subsystem, according to embodiments of the disclosure.

FIG. 4 illustrates an alternative example flow to process a read request directed to a data object stored in a storage array. For purposes of illustration only, FIG. 4 is described using the example storage subsystem 110 of FIG. 1 and the example data object 220 as stored in storage array 108 as illustrated in FIG. 2.

At 402 storage subsystem 110 receives read request 400 to read data object 220. For purposes of describing the example, read request 400 requests to read segments 230 and 240. Storage subsystem 110 can process the read request to determine which storage device, or devices, in storage array 108 contain data object 220, or components thereof. For purposes of illustrating the example, storage subsystem may determine that a copy of data object 220, or at least of the segments 230 and 240 of data object 220, is stored on both storage devices 152 and 154. According to operating conditions or utilization of one or more resources of the storage subsystem (e.g., subsystem resources to issue or monitor read operations directed to the storage devices) storage subsystem 110 may determine to split the read request between storage devices 152 and 154, such as to read segment 230 from storage device 152 and to read segment 240 from storage device 154. For example, storage subsystem 110 may determine that both of storage device 152 and 154 are utilized at levels at which additional read commands directed to either of them does not reduce, and may even improve, overall performance. For example, reading each of segments 230 and 240 from different storage devices can produce a lower overall read latency to return the segments to an accessor that originated or communicated read request 400.

Accordingly, at 404 storage subsystem 110 communicates (e.g., using interface 128) one or more read commands to storage device 152 to read the data blocks 232 and 234 comprising segment 230 on storage device 152. A command to read data from a storage device can be directed to a segment (e.g., 230) or to the particular data blocks (e.g., 232 and 234) stored on the storage device. At 406 storage device 152 communicates (e.g., using interface 128) data blocks 232 and 234 on storage device 152 to the storage subsystem. At 408 storage subsystem 110 communicates (e.g., using interface 128) one or more read commands to storage device 154 to read the data blocks 262 and 264 comprising segment 240 on storage device 154. At 410 storage device 154 communicates (e.g., using interface 128) data blocks 262 and 264 on storage device 154 to the storage subsystem.

Embodiments need not communicate read commands and data blocks between a storage subsystem and storage devices in a serial manner, or order, such as in the foregoing description of FIG. 4. For example, an embodiment can communicate read commands, such as at 404 and 408, from a storage subsystem to the storage devices in parallel, or concurrently, and the devices can communicate the data blocks, such as at 406 and 410, in parallel, or concurrently, and in various orders relative to each other. Using the example of FIG. 4, storage subsystem 110 can communicate a read command at 408 to storage device 154, and can communicate a read command at 406 to storage device 152 while concurrently receiving data from storage device 154 at 410. In another example, storage subsystem 110 can communicate a read command at 408 to storage device 154, and can communicate a read command at 404 to storage device 152 and receive data from storage device 152, at 406, prior to or concurrent with receiving data from storage device 154 at 410.

At 412 the storage subsystem communicates the data to the accessor to complete processing read request 400. A storage subsystem can communicate data associated with a read request (as at 412) when the subsystem has received all of the data blocks from the storage array, or can communicate (as at 412) the data as subsets of the data blocks as the data blocks are received from the storage array. Similarly, a storage array can communicate data associated with one or more read commands (as at 406 or 410) when the array has received all of the data blocks from the storage devices, or can communicate (as at 406 or 410) subsets of the data blocks as they are received from the storage devices.

Figure 5:
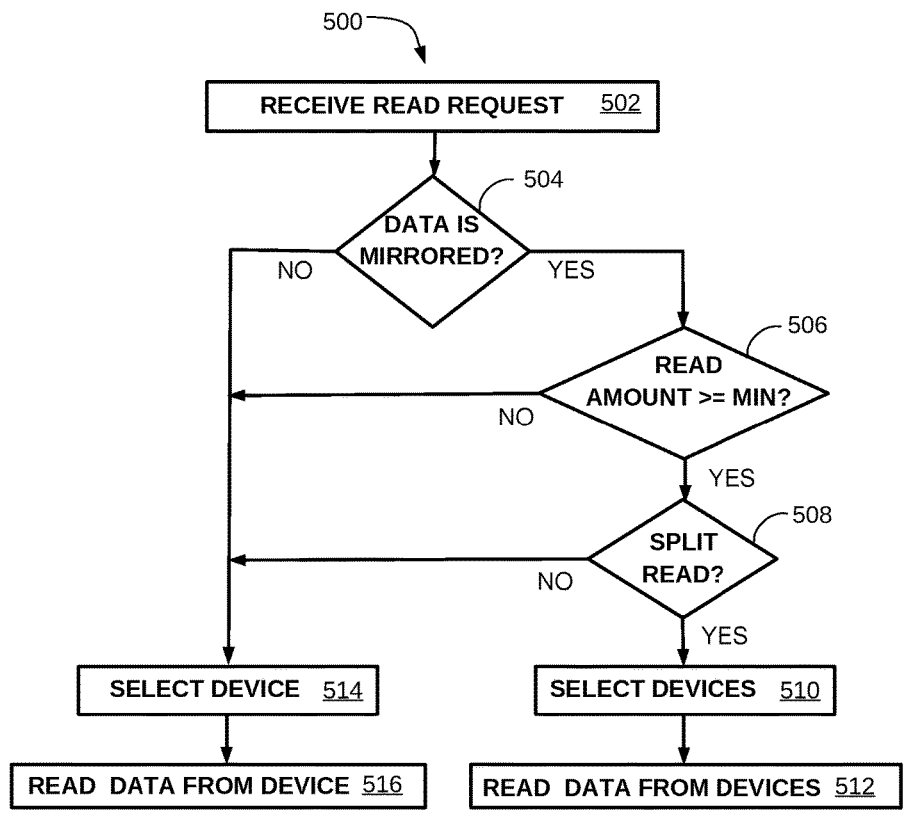
FIG. 5 is a flowchart that illustrates an example method to determine to split a read request, according to embodiments of the disclosure.

FIG. 5 illustrates an example method, 500, to determine to split a read request, according to embodiments of the disclosure. For purposes of illustrating the method, but not limiting to embodiments, the method is described as performed by a storage subsystem utilizing a storage array, such as the example storage subsystem 110 and example storage array 108 of FIG. 1. However, in embodiments the method, or portions thereof, can be performed, for example, by a storage controller included in a storage subsystem; by a processor, program, and/or firmware included in a storage controller; by an ASIC other form of logic included in a storage controller; or by a processor, program, firmware, and/or ASIC or logic operating in a computing device coupled to a storage subsystem, storage array, or storage devices.

Additionally, in embodiments a storage subsystem can include storage devices as components of the storage subsystem and may not include a storage array as illustrated in the example of FIG. 1. It would be apparent to one of ordinary skill in the art that within the scope of the disclosure, a computing system, or a storage subsystem, can utilize a plurality of storage devices in a variety of configurations other than as illustrated in FIG. 1.

At 502, the storage subsystem receives a request to read a data object, or a portion thereof. At 504 the subsystem determines whether a copy of the data is stored on more than one storage device included in the storage subsystem or included in a storage array. The storage subsystem can determine that a copy of the requested data is stored on one or more than one devices using techniques known to one of ordinary skill in the art. For example, a storage subsystem can utilize a directory, file index, and/or file system to record, and/or determine, the storage devices and/or locations (e.g., particular block locations) that have a copy of the requested data. A storage subsystem can record, and/or determine, the storage devices that have a copy of the requested data, and the storage devices can record, and/or determine, the locations (e.g., data blocks) that contain the copy.

If, at 504, the storage subsystem determines that the requested data is stored on only one storage device utilized by the subsystem, at 514 the storage subsystem selects the device and at 516 initiates reading the requested data from that device. If, on the other hand, at 504 the subsystem determines that more than one storage device stores a copy of the requested data (or, a portion of the requested data), at 506 the storage subsystem determines if the amount of the data requested (e.g., a number of data blocks) is at least a minimum amount of data.

The minimum amount of data can be associated with, or derived from, the particular design of the subsystem or storage devices (e.g., by taking performance measurements under various workloads). The minimum amount of data can be, for example, an amount for which overall performance, or components or storage devices utilized by the storage subsystem to perform the read, can benefit from splitting reading the data across a plurality of the storage devices having a copy. For example, according to a particular design of a storage subsystem, or of storage devices utilized by the storage subsystem, reading an amount of data less than a particular number of data blocks, from more than one storage device having a copy of the data, may be known to have no benefit to reducing, for example, overall read latency (e.g., the amount of time from when the request is received to complete receiving all of the requested data from the storage devices).

Correspondingly, at 506 the storage subsystem may determine that a read request for less than a particular minimum amount of data should not be split. If so, at 514 the storage subsystem selects one of the storage devices having a copy of the requested data and, at 516, initiates reading the requested data from that device. Otherwise, if the storage subsystem determines that the amount of data in the read request is at least the particular minimum amount to potentially split the request, at 508 the subsystem determines if other criteria are met to split the request across two or more storage devices having a copy of the requested data.

For example, at 508 a storage subsystem can determine to split a read request based on a utilization condition satisfying a split-read criterion. A utilization condition can be, or can be associated with, a utilization level of a resource of the storage subsystem associated with reading the data object. For example, with reference to storage subsystem 110 of FIG. 1, a utilization condition can be, or can be associated with, a utilization level of processor 116, control hardware 118, one or more of the storage devices (e.g., 152 and/or 154), or an interface (e.g., 122 or 128). A utilization condition can satisfy a split-read criterion, for example, if the utilization condition is at, or below, a threshold value. Alternatively, a utilization condition can fail to satisfy a split-read criterion if, for example, the utilization condition is above threshold value.

At 508, a utilization condition satisfying a split-read criterion can indicate that splitting the read request into a plurality of read operations may benefit overall performance of the subsystem. For example, a utilization condition associated with utilization of one or more storage devices can satisfy a split-read criterion and splitting the read request into a plurality of read operations can reduce the latency to read the data object. Under some utilization conditions (such as a momentary utilization level of a storage device), splitting a request into a plurality of read operations could reduce latency to complete the read request, for example, without reducing the number of operations per unit of time that the subsystem can perform, such that splitting the request is beneficial to overall performance.

Alternatively, a utilization condition that does not satisfy a split-read criterion can indicate that splitting the read request into a plurality of read operations may be detrimental to overall performance of the subsystem. For example, splitting a read request can increase the load (or, demand) on resources of the subsystem or storage devices and can reduce the number of operations per unit of time that the subsystem can perform, or can increase the latency to complete read requests.

If, at 508, the subsystem determines not to split the read request, at 514 the storage subsystem selects one of the storage devices having a copy of the data and, at 516, initiates reading the requested data from that device. Alternatively, if at 508 the subsystem determines to split the read request, at 510 the subsystem selects two or more of the storage devices having a copy of the data. At 510, the subsystem can select which storage devices to use to read the requested data based on various criteria. For example, the subsystem can select two particular storage devices because they may be the only storage devices that have a copy of the requested data. In embodiments in which more than two storage devices have a copy of the requested data, a subsystem can select, for example, storage devices that are less utilized (e.g., have fewer outstanding, or pending, read and/or write commands) than one or more other storage devices having a copy. In another example, if more than two storage devices have a copy of the requested data, a subsystem can select, for example, storage devices that have lower access latency to read the requested data, as compared to one or more other storage devices having a copy.

At 512, the subsystem determines an amount of data to read from each of the selected storage devices (e.g., a number or set of data blocks to read from one device, and a different number or set of data blocks to read from another device) and initiates reading the data from the selected devices. At 512, the subsystem can determine how much data to read from each of the selected devices based on various criteria. For example, in an embodiment, the storage devices having a copy of the requested data may have equal operating parameters (e.g., access latency) or workload states (e.g., utilization conditions) and a subsystem can determine the amount of data to read from each storage device to be an even proportion, such as ½ the data between each of two storage devices, ⅓ of the data from each of three storage devices, and so forth. In other embodiments, one or more of the storage devices having a copy may be lower utilized, or have lower access latencies than other storage devices having the copy, and the subsystem may determine to the amount of data to read from each storage device in proportion to their relative momentary utilization conditions, and/or performance characteristics.

In some embodiments, a subsystem can determine to read an amount of the data object from one storage device and another amount to read from another storage device, and the amounts can include some portion of the data object in common. For example, in an embodiment it may more efficient to read more than a unique portion of data from each device, and to later discard the portion in common read from one of the storage devices.

At 508, the subsystem can utilize a variety of operating and/or utilization conditions and split-read criteria to determine whether to split the request or to read all of the requested data from one particular storage device having a copy of the data. For example, a storage subsystem can have a particular set of resources to communicate or monitor split read commands. In one example, a storage subsystem (or a component thereof) may have resources to support a certain number of parallel read commands issued to storage devices, and these resources can be allocated from a resource queue (e.g., a "free resource" queue), or tracked with a bit mask (for example). If the queue is empty, or the bit mask represents all resources in use (i.e., there are no such resources momentarily available), for example, at 508 the subsystem may determine not to split the read request across multiple storage devices.

In another example, an embodiment can apply a split-read criterion to a utilization condition of one or more resources of the subsystem to determine to split a read request or, alternatively, to read the data from only one storage device. For example, a storage subsystem can include a controller (e.g., such as controller 112 of FIG. 1, or a hardware component that performs operations associated with processing a read request), and a subsystem can evaluate a utilization condition of the storage controller, or components thereof (e.g., a processor), with respect to a utilization criterion to determine to split a request. A storage subsystem can include memories, data buses, command or response queues or buffers, or other such resources for which a utilization condition of one or more of these resources can be considered in criteria to split a read request.

To determine to split a read request, a subsystem can evaluate instantaneous, or average or periodic utilization, of resources to determine a utilization condition, and a split-red criterion can be a utilization condition to, for example, above (or, alternatively, below) a threshold value. For example, if a utilization condition of one or more of the resources associated with processing a read request is above a threshold, the subsystem can determine that splitting the read request is either not beneficial to, or possibly may degrade, overall performance and can then determine not to split the request. Alternatively, if a utilization condition is below a threshold level (e.g., for one or all of the resources), the subsystem can determine that splitting the read request may benefit overall performance and can then determine to split the request.

Figure 6:
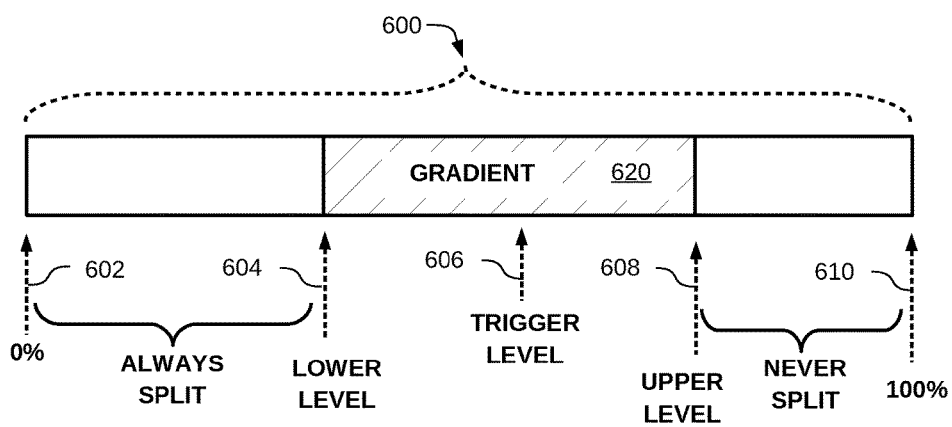
FIG. 6 is a diagram illustrating an example utilization gradient, according to embodiments of the disclosure.

In some embodiments, a utilization condition can be based on a range of utilization levels, or utilization "gradient", associated with resources of the subsystem, to determine to split a read request or not. FIG. 6 illustrates an example of a utilization gradient according to embodiments of the disclosure. An embodiment can establish a range of utilization values of one or more resources that can comprise a utilization gradient. The gradient can have a lower utilization level, below which read requests which request reading at least a minimum amount of data—a "splitting amount"—are always split across at least two storage devices having a copy of the requested data. In FIG. 6, utilization 600 of a resource ranges from 0% to 100%. Utilization gradient 620 lies within the range of 0 to 100% (inclusive) and has a lower utilization level 604. If a subsystem receives a read request to read at least the splitting amount of data, the subsystem can determine that the present utilization of the resource is at or below the lower level of the gradient and, accordingly, to split reading the data across a plurality of the storages devices having a copy of the requested data. For example, a subsystem may be designed such that at a utilization of 50% (a lower utilization threshold) or less of a particular resource of the subsystem (e.g., a processor of a storage controller, a set of memory buffers, or a particular storage device), splitting read requests always benefits overall performance of the storage subsystem, or particular read requests. Correspondingly, the subsystem can determine to split all read requests processed under a utilization condition of the resource at or below 50% (the example lower threshold).

A gradient can have an upper utilization level, above which read requests are never split, but always directed to just one storage device having a copy of the requested data. Gradient 620 has an upper utilization level of the resource, 608. If a subsystem receives a read request to read, for example, at least the splitting amount of data, the subsystem can determine that the present utilization of the resource is above the upper level of the gradient and, accordingly, to not split reading the data and instead read the data from only one of the storages devices having a copy of the requested data. For example, a subsystem may be designed such that 80% utilization (an upper utilization threshold) of a particular resource of the subsystem (e.g., a processor of a storage controller, a set of memory buffers, or a particular storage device), is a utilization condition at which splitting read requests does not benefit, and may reduce, overall performance. Correspondingly, the subsystem can determine to not split any read requests processed under a utilization condition of the resource at or above 80% (the example the upper threshold).

However, in embodiments it can be beneficial to overall subsystem performance, to occasionally, or periodically, split read requests processed under received utilization conditions of one or more resources within (inclusive of the lower and upper levels) a utilization gradient. A subsystem can determine a trigger level (or, trigger threshold) utilization of a resource (or, resources) within the gradient to determine to split some read requests received while the resource(s) are operating at utilizations within the gradient. As an example, FIG. 6 illustrates a trigger threshold, 606, within gradient 620. Upon receiving a read request, a subsystem can, for example, determine if utilization of one or more resources is within the gradient and, if so, whether the utilization is at or below the trigger threshold.

When processing a read request and one or more resources are utilized at or below a corresponding trigger level, a subsystem can determine to split the read into multiple read operations and/or commands. In embodiments, splitting read requests when a resource is utilized within a utilization gradient range can a positive effect on overall subsystem performance, even though the utilization is above the gradient lower level. For example, occasionally splitting a read request can benefit latency to complete the request and, yet, not negatively affect overall (e.g., over an average period of time) performance of the subsystem.

Accordingly, in some embodiments splitting read requests based on some measure of randomness, for utilization conditions of a resource within a corresponding utilization gradient, can improve overall performance (e.g., reduce latency to complete a read request). For example, a subsystem can generate a "pseudo-utilization" number in association with a resource, and compare this to the trigger threshold. The pseudo-utilization level can be generated to incorporate randomness that sometimes, but not always, results in a utilization level below the trigger threshold. For example, upon receipt of a read request, a subsystem can generate a pseudo-utilization condition by, for example, multiplying a random number (e.g., a clock or timer value multiplied by a prime number) by the utilization gradient range (e.g., 0.8 minus 0.5, for a utilization gradient between 50% and 80% utilization). If the subsystem receives a read request while utilization a resource is within a corresponding utilization gradient, and the product of the random number and gradient range (i.e., the pseudo-utilization number) is at or below the trigger threshold, the subsystem can determine to split the read request.

In embodiments, a utilization gradient range and/or trigger thresholds can be associated with, or derived from, the particular design of the subsystem or storage devices. For example, by taking performance measurements under various workloads a subsystem designer can determine a utilization gradient. Embodiments can determine a utilization gradient for any of a variety of particular resources, for a single resource or resource type, for each of a plurality of resources, or for a combination of various resources.

A particular computing or storage workload of a computing system, or other operating conditions of a subsystem (e.g., failure or addition of a storage device within the subsystem), can determine operating conditions, or utilization levels, of a storage subsystem or resources thereof. Over a period of time one or more of the workloads or operating conditions can change. Periodically re-calculating (or, adjusting) a trigger threshold based on a criterion sufficient to detect such changes can, in some embodiments, benefit overall performance.

Figure 7:
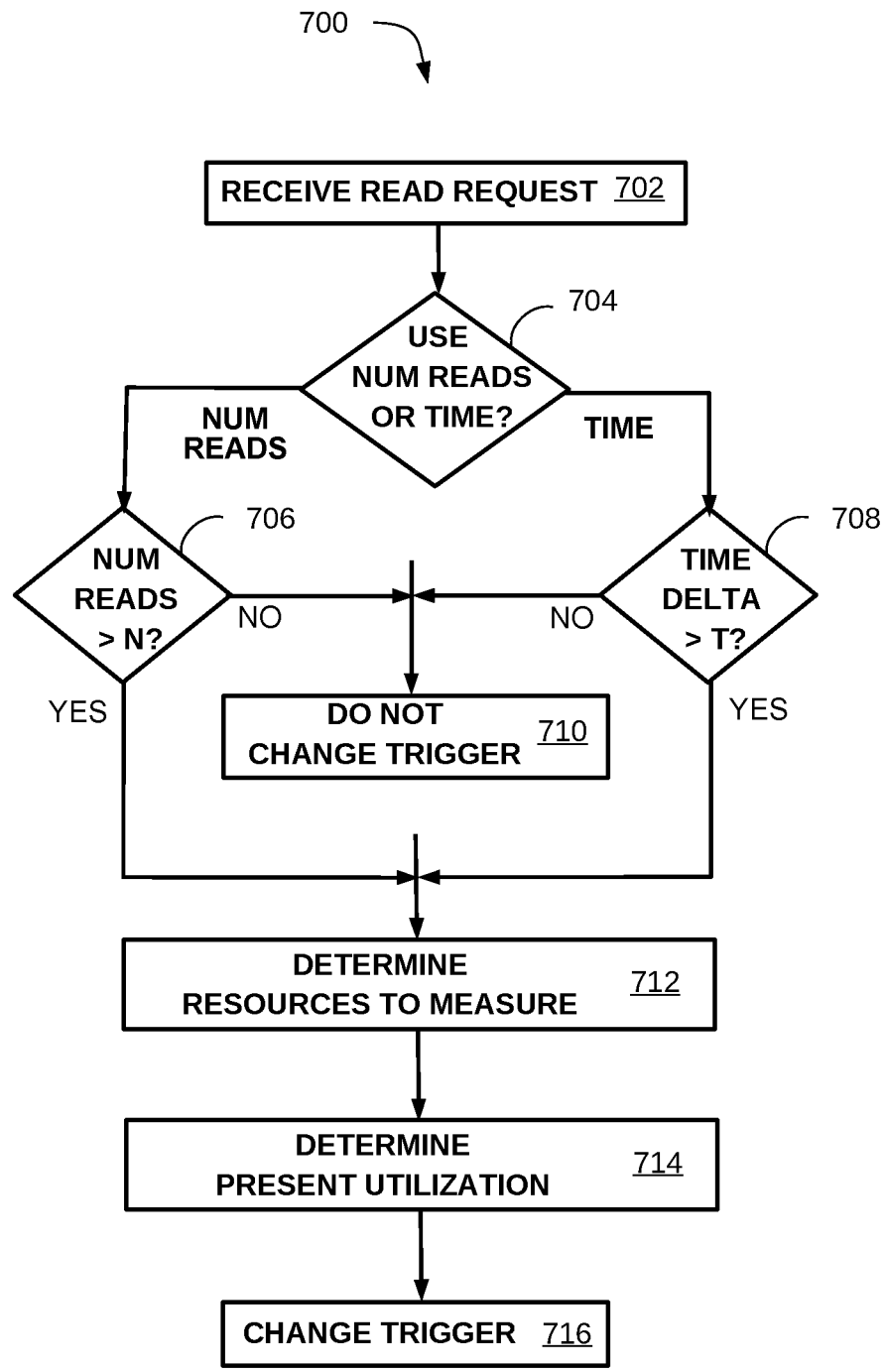
FIG. 7 is a flowchart that illustrates an example method to determine a utilization threshold, according to embodiments of the disclosure.

Accordingly, FIG. 7 illustrates an example method, 700, to periodically re-calculate, or adjust, a trigger threshold within a utilization gradient, based on criteria that can, in some embodiments, be sufficient to detect changes in operating conditions or utilization of resources that correspond, for example, to changes in workloads or other operating conditions of a subsystem. For purposes of illustrating the method, but not limiting to embodiments, the method is described as performed by a storage subsystem utilizing a storage array, such as the example storage subsystem 110 and example storage array 108 of FIG. 1. However, it would be apparent to one of ordinary skill in that art that various elements, or components of an embodiment can perform the method, or portions thereof, including, for example, a storage controller, a processor executing a program and either included in, or coupled to, a storage subsystem, or other components included in or coupled to a storage subsystem. It would be apparent to one of ordinary skill in the art that within the scope of the disclosure, a computing system, or a storage subsystem, can utilize a plurality of storage devices in a variety of configurations other than as illustrated in FIG. 1.

At 702, the subsystem receives a read request. In response to receiving the request the subsystem determines whether to recalculate the threshold trigger, based on (for example) a total number of read requests received (optionally, including the present read request), or an amount of time that has passed, since the last calculating of the trigger threshold.

At 704, if the subsystem determines to use the number of read requests received since a prior recalculation, at 706 the subsystem compares the number to a minimum number of read requests, "N", to initiate recalculation. Alternatively, if at 704, the subsystem determines to use an amount of time that has elapsed since a prior recalculation, at 708 the subsystem compares the number to a minimum amount of elapsed time, "T", to initiate recalculation. The minimum number of read requests, and/or the minimum amount of elapsed time, can be associated with, or derived from, the particular design of the subsystem or storage devices (e.g., by taking performance measurements under various workloads).

According to the example method 700, receiving a read request (702), and comparing to a number of read requests or time elapsed since a prior recalculation (704 and 706, respectively), initiates re-calculating the trigger threshold. However, this is not intended to limit embodiments and it would be apparent to one of ordinary skill in the art that other events (e.g., expiration of a timer) or operating conditions of a subsystem (e.g., changes in rate of read requests received) can substitute for 704-708 to initiate recalculating a trigger threshold.

At 706, if the subsystem determines that the number of read requests received is below the minimum recalculation number or, at 708, that the amount of time elapsed is below the minimum recalculation time, since the last recalculation of the trigger threshold at 710 the subsystem does not change the trigger threshold and completes performing method 700. Alternatively, if at 706 the subsystem determines that the number of read requests received is at or above the minimum number or, at 708, that the amount of time is at or above the minimum elapsed, since the last recalculation of the trigger threshold, at 712 the subsystem determines particular resources, or resource types, associated with the trigger threshold for which to measure utilization (e.g., a processor, internal data buses, memory queues or data buffers, read processing hardware, and/or one or more storage devices). At 714 the subsystem measures (or, in some other manner, determines) a present utilization condition of the resource(s) selected at 712.

At 716, the subsystem changes the trigger threshold according to the present utilization condition of the resource(s). If a present utilization condition of the resource is at or below the lower threshold, the subsystem can determine, for example, to not modify the trigger threshold, as the present utilization of the resource is at or below the threshold to split read requests. Alternatively, if the present utilization condition is at or above the upper threshold, the subsystem can apply a calibration factor to the present utilization to calculate a new trigger threshold. For example, subsystem can have a pre-determined target of splitting 25% of read requests received at a utilization of a resource above the lower threshold of a utilization gradient. Accordingly, the subsystem can (again, for example) calculate the new trigger threshold as a utilization that is 25% of the gradient range (i.e., at a point 25% of the range and above the lower threshold). It would be apparent to one of ordinary skill in the art that an embodiment can use a variety of methods to calibrate a present utilization of a resource to remain within the bounds of a utilization gradient.

Embodiments of the disclosure can include a system and/or a computer program product at any possible technically detail level of integration. A system can elements (e.g., a storage subsystem, and/or components thereof) and/or perform methods such as illustrated in the disclosure.

A computer program product can include a computer readable storage medium (or media) having computer readable program instructions thereon for causing a processor to carry out aspects of the present invention. The processor can be a component of a storage subsystem, or can be a processor in communication with a storage subsystem. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing read operations in a storage subsystem, wherein the method comprises:

receiving a read request at a storage subsystem, wherein the read request comprises a request to read at least a portion of a data object;

determining, via the storage subsystem, that a plurality of storage devices included in the storage subsystem have a copy of the at least a portion of the data object, wherein each respective storage device of the plurality of storage devices is capable of performing a read request on a respective copy of the at least a portion of the data object stored on the respective storage device;

determining, via the storage subsystem, based at least in part on the plurality of storage devices having the copy, a utilization condition associated with an at least one processing resource, the at least one processing resource associated with reading the at least a portion of the data object;

determining whether to recalculate a trigger threshold based on a total number of received read requests since a previous recalculation of the trigger threshold and a recalculation threshold;

recalculating the trigger threshold in response to determining that the total number of received read requests is higher than the recalculation threshold;

determining that the utilization condition satisfies a split-read criterion based on a comparison of the utilization condition to the trigger threshold;

determining, via the storage subsystem, based at least in part on the utilization condition satisfying the split-read criterion, to read the at least a portion of the data object using a plurality of read operations, and wherein each of the plurality of read operations is directed to a different storage device included in the plurality of storage devices having the copy; and reading, via the storage subsystem, the at least a portion of the data object using the plurality of read operations.

2. The method of claim 1, wherein the utilization condition comprises an available capacity of the at least one processing resource.

3. The method of claim 1, wherein the utilization condition comprises a pseudo-utilization level of the at least one processing resource, wherein the pseudo-utilization level corresponds to a predetermined numerical value that represents an amount that the at least one processing resource is being utilized within the plurality of storage devices, wherein the trigger threshold comprises a utilization level of the at least one processing resource within a utilization gradient, wherein the utilization gradient comprises a lower threshold and a higher threshold, wherein the lower threshold corresponds to a utilization of the at least one processing resource below which the reading the at least a portion of data object using the plurality of read operations increases overall performance of the storage subsystem, and wherein the higher threshold corresponds to a utilization of the at least one processing resource above which the reading the at least a portion of data object using the plurality of read operations decreases overall performance of the storage subsystem.

4. A system for performing read operations in a computing system, wherein the system comprises:

a storage subsystem, wherein the storage subsystem includes a plurality of storage devices;

an interface, wherein the storage subsystem is configured to receive a read request by means of the interface; and a storage controller, wherein the storage controller is further configured to:

receive the read request from the storage subsystem, wherein the read request is a request to read at least a portion of a data object;

determine that at least two storage devices have a copy of the at least a portion of the data object, wherein the at least two storage devices are included in the plurality of storage devices included in the storage subsystem, wherein each respective storage device of the plurality of storage devices is capable of performing a read request on a respective copy of the at least a portion of the data object stored on the respective storage device;

determine, based at least in part on the at least two storage devices having the copy, a utilization condition associated with an at least one processing resource, the at least one processing resource associated with reading the at least a portion of the data object;

determine whether to recalculate a trigger threshold based on a total number of received read requests since a previous recalculation of the trigger threshold and a recalculation threshold recalculate the trigger threshold in response to determining that the total number of received read requests is higher than the recalculation threshold;

determine that the utilization condition satisfies a split-read criterion based on a comparison of the utilization condition to the trigger threshold;

determine, based at least in part on the utilization condition satisfying the split-read criterion, to read the at least a portion of the data object using a plurality of read operations, and wherein each of the plurality of read operations is directed to a different storage device included in the at least two storage devices having the copy; and read the at least a portion of the data object using the plurality of read operations.

5. The system of claim 4, wherein the utilization condition comprises an available capacity of the at least one processing resource.

6. The system of claim 4, wherein the utilization condition comprises a pseudo-utilization level of the at least one processing resource, wherein the pseudo-utilization level corresponds to a predetermined numerical value that represents an amount that the at least one processing resource is being utilized within the plurality of storage devices, wherein the trigger threshold comprises a utilization level of the at least one processing resource within a utilization gradient, wherein the utilization gradient comprises a lower threshold and a higher threshold, wherein the lower threshold corresponds to a utilization of the at least one processing resource below which the reading the at least a portion of data object using the plurality of read operations increases overall performance of the storage subsystem, and wherein the higher threshold corresponds to a utilization of the at least one processing resource above which the reading the at least a portion of data object using the plurality of read operations decreases overall performance of the storage subsystem.

7. A computer program product comprising a computer readable storage medium having program instructions embodied therewith, the program instructions executable by a processor to perform a method for reading data in a storage subsystem, wherein the processor is in communication with a memory, wherein the memory is capable of storing at least a subset of the program instructions, wherein the processor is capable of executing the subset of the program instructions stored in the memory, and wherein the method comprises:

receiving, via the processor, a read request comprising a request to read at least a portion of a data object, determining, via the processor, that a plurality of storage devices included in the storage subsystem have a copy of the at least a portion of the data object, wherein each respective storage device of the plurality of storage devices is capable of performing a read request on a respective copy of the at least a portion of the data object stored on the respective storage device;

determining, by the processor, based at least in part on the plurality of storage devices having the copy, a utilization condition associated with an at least one processing resource, wherein the at least one processing resource is associated with reading the at least a portion of the data object;

determining whether to recalculate a trigger threshold based on a total number of received read requests since a previous recalculation of the trigger threshold and a recalculation threshold;

recalculating the trigger threshold in response to determining that the total number of received read requests is higher than the recalculation threshold;

determining that the utilization condition satisfies a split-read criterion based on a comparison of the utilization condition to the trigger threshold;

determining, via the processor, based at least in part on the utilization condition satisfying the split-read criterion, to read the at least a portion of the data object using a plurality of read operations, and wherein each of the plurality of read operations is directed to a different storage device included in the plurality of storage devices having the copy; and reading, via the processor, the at least a portion of the data object using the plurality of read operations.

8. The computer program product of claim 7, wherein the utilization condition comprises an available capacity of the at least one processing resource.

9. The computer program product of claim 7, wherein the utilization condition comprises a pseudo-utilization level of the at least one processing resource, wherein the pseudo-utilization level corresponds to a predetermined numerical value that represents an amount that the at least one processing resource is being utilized within the plurality of storage devices, wherein the trigger threshold comprises a utilization level of the at least one processing resource within a utilization gradient, wherein the utilization gradient comprises a lower threshold and a higher threshold, wherein the lower threshold corresponds to a utilization of the at least one processing resource below which the reading the at least a portion of data object using the plurality of read operations increases overall performance of the storage subsystem, and wherein the higher threshold corresponds to a utilization of the at least one processing resource above which the reading the at least a portion of data object using the plurality of read operations decreases overall performance of the storage subsystem.

* * * * *